US012503910B2

(12) United States Patent
Biffi et al.

(10) Patent No.: US 12,503,910 B2
(45) Date of Patent: Dec. 23, 2025

(54) INSULATED GLAZING UNITS WITH MEMORY MODULES

(71) Applicant: PELLINI S.P.A., Codogno (IT)

(72) Inventors: Sergio Biffi, Codogno (IT); Alessandro Nicolosi, Codogno (IT); Luca Papaiz, Codogno (IT); Alessandro Pellini, Codogno (IT)

(73) Assignee: PELLINI S.p.A., Codogno (IT)

( * ) Notice: Subject to any disclaimer, the term of this patent is extended or adjusted under 35 U.S.C. 154(b) by 719 days.

(21) Appl. No.: 17/640,786

(22) PCT Filed: Jul. 21, 2020

(86) PCT No.: PCT/IB2020/056824
§ 371 (c)(1),
(2) Date: Mar. 4, 2022

(87) PCT Pub. No.: WO2021/044226
PCT Pub. Date: Mar. 11, 2021

(65) Prior Publication Data

US 2022/0307318 A1 Sep. 29, 2022

(30) Foreign Application Priority Data

Sep. 6, 2019 (IT) ........................ 102019000015788

(51) Int. Cl.
*E06B 9/264* (2006.01)
*E06B 3/67* (2006.01)
*E06B 9/322* (2006.01)

(52) U.S. Cl.
CPC ............ *E06B 9/264* (2013.01); *E06B 3/6722* (2013.01); *E06B 9/322* (2013.01); *E06B 2009/2643* (2013.01)

(58) Field of Classification Search
CPC .................. E06B 9/264; E06B 3/6722; E06B 2009/2643; E06B 1/56; E06B 2001/628;
(Continued)

(56) References Cited

U.S. PATENT DOCUMENTS 4,309,080 A * 1/1982 Hanchard ............. E06B 3/6722 359/886
2006/0076113 A1* 4/2006 Park ........................ E06B 9/264 160/107
(Continued)

FOREIGN PATENT DOCUMENTS

AT 513145 B1 * 2/2014 ............... E06B 9/32
CN 111779413 A * 10/2020 ................ E05F 1/16
(Continued)

OTHER PUBLICATIONS

International Search Report and Written Opinion in corresponding International Application No. PCT/IB2020/056824 mailed on Mar. 18, 2021, 12 pages.

*Primary Examiner* — Babajide A Demuren
(74) *Attorney, Agent, or Firm* — MH2 TECHNOLOGY LAW GROUP LLP

(57) ABSTRACT

An insulated glazing unit may include: a frame; at least two panes associated with the frame to define a gap; a box inside the gap; screening means in the gap configured to alternate between at least retracted and deployed configurations; an actuator in the box, wherein the actuator may include an electric motor to move the screening means between the retracted and deployed configurations; a power supply including: a stationary portion, including a support external to the gap and an electrical cable to connect the support to the electric motor; and a moving portion, configured to electrically connect to/disconnect from the stationary portion; a control unit in signal communication with the electric motor, configured to switch on/off the electric motor; and an
(Continued)

active electronic circuit in signal communication with the control unit and configured to store identification data. The active electronic circuit may be integrated in the support.

20 Claims, 2 Drawing Sheets

(58) Field of Classification Search
CPC ..... E06B 1/26; E04B 1/08; E04B 1/10; E04B 2/58; E04B 2/70; E04B 2002/565
See application file for complete search history.

(56) References Cited

U.S. PATENT DOCUMENTS

| | | | | |
|---|---|---|---|---|
| 2007/0267150 | A1 * | 11/2007 | Schaumberger | E06B 9/264 52/204.6 |
| 2016/0186488 | A1 * | 6/2016 | Gardiner | E06B 9/264 160/1 |
| 2017/0159352 | A1 * | 6/2017 | Cooper | E06B 9/72 |

FOREIGN PATENT DOCUMENTS

| | | | | | |
|---|---|---|---|---|---|
| CN | 114458142 | A | * | 5/2022 | A47L 4/00 |
| CN | 115059388 | A | * | 9/2022 | E06B 3/64 |
| CN | 117489254 | A | * | 2/2024 | |
| DE | 10317914 | A1 | | 1/2004 | |
| EP | 1936103 | A2 | | 6/2008 | |
| EP | 1936103 | B1 | | 7/2010 | |
| EP | 2733298 | A2 | | 5/2014 | |
| WO | 02064938 | A1 | | 8/2002 | |

* cited by examiner

INSULATED GLAZING UNITS WITH MEMORY MODULES

CROSS-REFERENCE TO RELATED APPLICATION(S)

This application is a national stage entry from International Application No. PCT/IB2020/056824, filed on Jul. 21, 2020, in the Receiving Office ("RO/IB") of the International Bureau of the World Intellectual Property Organization ("WIPO"), and published as International Publication No. WO 2021/044226 A1 on Mar. 11, 2021; International Application No. PCT/IB2020/056824 claims priority from Italian Patent Application No. 102019000015788, filed on Sep. 6, 2019, in the Italian Patent and Trademark Office ("IPTO"), the entire contents of all of which are incorporated herein by reference.

TECHNICAL FIELD

The present invention relates to an insulated glazing unit, i.e. a device used in the building industry, as defined in the preamble of claim 1.

BACKGROUND ART

An insulated glazing unit of the prior art comprises a frame and two parallel glass panes sealingly fixed to the frame to define a gap.

Therefore, this gap forms a volume that is separate from the outside of the insulated glazing unit.

A screening element, e.g. a Venetian blind, is placed within the gap. This screening element may alternate between a collapsed configuration and a deployed configuration. In the collapsed configuration, the screening element is situated proximate to the upper portion of the frame and the light can pass undisturbed through the gap, whereas in the deployed configuration the screening element occupies the gap thereby partially or entirely blocking the light. Various intermediate configurations are also possible, i.e. partially deployed configurations.

In the prior art insulated glazing unit, the movement of the blind is actuated by a set of cords and ladders which are operably connected on a roller which is, for example, housed in a box arranged proximate to the upper portion of the frame and inside the gap.

Such roller is typically driven by an electric motor.

A control unit is operably connected to the electric motor to control its operation for deployment of the bind in the insulated glazing unit.

This electric motor can be powered by the electrical mains of the building.

If the motor of the insulated glazing unit cannot or should not be connected to the mains, other power supply means, such as a battery module, may be used. Here, the insulated glazing unit is equipped with a support which is associated with the frame in a stationary or unremovable manner. The battery module can be mechanically and electrically connected to this support. The support is in turn electrically connected to the electric motor for transferring power from the battery to the motor. An example of an insulated glazing unit employing this type of power supply is disclosed in EP 1936103.

Nevertheless, this power supply arrangement requires the battery to be charged every time the charge runs out. Recharging operations by the user may be limited by equipping the insulated glazing unit with one or more photovoltaic panels, operably connected to the support to recharge the battery when the latter is associated with the support.

As mentioned above, the electric motor that drives the blind may be controlled by means of a control element consisting of the combination of:

- a control interface, for example of touch-responsive type, arranged on the surface of the battery module and adapted to be touched by the user to control the electric motor of the insulated glazing unit when the battery is associated with its support;
- a radio control interfaced with a receiving module integrated with the battery module and configured to put the radio control in signal communication with the electric motor to thereby control the electric motor of the insulated glazing unit when the battery module is associated with its support without having to touch its surface and
- a control electronics for switching the electric motor on and off, said electronics being arranged, for example, in the box and proximate to the electric motor.

If multiple insulated glazing units are installed in the same zone, independent control of each of them is ensured by associating a distinct radio control, namely a radio control communication channel, with each of them. The association data is saved in a dedicated memory module which is integrated in the battery module.

Problem of the Prior Art

Since the battery module is removable from the insulated glazing unit, the memory in the battery module is also disconnected with the module.

If the battery module that powered the motor of a first insulated glazing unit is associated with another insulated glazing unit, then the user who operates the radio control will think he/she is moving the screening element of the first insulated glazing unit and will instead operate the motor of the insulated glazing unit with which the battery module has been associated.

As the number of insulating glazing units and their respective battery modules increases, such inadvertent undesired "crossings" may occur frequently, and cause considerable inconvenience to the user and possible problems.

For example, one may wish to open one screening element and actually actuate the screening element of another insulated glazing unit that had to remain in the closed configuration, for example for privacy reasons.

An additional issue may also arise if a faulty battery module is replaced with a new one. Here, the radio control association procedure has to be carried out again to replicate the configuration of the faulty battery module on the new one, which implies obvious waste of time and costs.

Finally, since the memory in which the radio control channel data is stored shares the fate of the battery module, it is not convenient to store further information concerning the insulated glazing unit such as the azimuth orientation and the position of the blind (raised, lowered and, in the case of a Venetian blind, slat orientation degree) since the memory resides on the battery module and there is no certainty that the battery module will be always repositioned on the same window if it is detached from the support.

In a context not concerning insulated glazing units, WO 02064938 teaches to directly fix the memory unit required for control directly to the drive of the motor that moves a blind. Nevertheless, in the case of insulated glazing units, the drive is located inside the gap. This environment may reach temperatures that are susceptible to damage a memory unit, about 80° C., and is also almost inaccessible for maintenance without dismantling the entire insulated glazing unit.

SUMMARY OF THE INVENTION

Therefore, the technical purpose of the present invention is to provide an insulated glazing unit that can obviate the aforementioned prior art drawbacks.

In particular, an object of the present invention is to provide an insulated glazing unit that can maintain a unique association between the insulated glazing unit and the control element.

The aforementioned technical purpose and objects are substantially fulfilled by an insulated glazing unit that comprises the technical features as disclosed in one or more of the accompanying claims.

Namely, an insulated glazing unit of the present invention comprises a frame. A pair of at least partially transparent panes are associated with the frame, thereby defining a gap.

Screening means are placed within the gap and can be alternated at least between a retracted configuration and a deployed configuration. In the retracted configuration, the screening means allow the passage of light through the gap. In the deployed configuration, the screening means at least partially block the passage of light in the gap.

The insulated glazing unit further comprises actuator means, preferably of electric type, associated with the screening means to alternate them at least between the retracted configuration and the deployed configuration.

A control unit is associated with the actuator means. This control unit comprises a data receiving module that can be associated with a control element. The control unit also comprises an active electronic circuit configured to store at least identification data of the control element.

The insulated glazing unit also comprises power supply means associated with the actuator means. These power supply means comprise a stationary portion integral with the frame. The power supply means further comprise a battery, that is adapted to be electrically connected/disconnected to/from the stationary portion. The memory module of the control unit is specifically associated with the insulating glass unit.

The above described insulated glazing solves the technical problem. This is because the active electronic circuit is no longer located in the battery module but is integral with the insulated glazing unit itself. Since the active electronic circuit is integrated in the support for the battery module, it remains outside the gap, which provides advantages in terms of easy access and reduced exposure to excessive temperatures.

LIST OF DRAWINGS

Further features and advantages of the present invention will result more clearly from the illustrative, non-limiting description of a preferred, non-exclusive embodiment of an insulated glazing unit as shown in the annexed drawings, in which.

DETAILED DESCRIPTION

Referring to the annexed figures, 1 generally designates an insulated glazing unit of the present invention.

The insulated glazing unit comprises a frame 2 that allows it to be inserted in a seat of a wall (not shown) or anchored to the structure of a building (not shown).

The frame 2 comprises a pair of uprights 3*a*, a lower cross member 3*b* and an upper cross member 3*c*. The cross members 3*b*, 3*c* are connected to both uprights 3*a*. Preferably, the frame 2 is formed with extruded plastic material, or extruded foamed material.

At least two panes 4, which are at least partly transparent, are associated with the frame 2. Such panes 4 may be for example glass panes.

In one embodiment, two glass panes may be provided, but in other embodiments, three, four or more glass panes may be also provided.

In any case, the frame 2 acts as spacers for the glass panes 4.

The shape and dimensions of the panes 4 as well as those of the frame 2 can be of conventional type and will not be further described.

When the panes 4 are associated with the frame 2, in a manner known per se and not further described, they define a gap 5. It should be noted here that the association between the frame 2 and the panes 4 is sealed, so that the gap 5 may be isolated from the outside environment.

Figure 1:
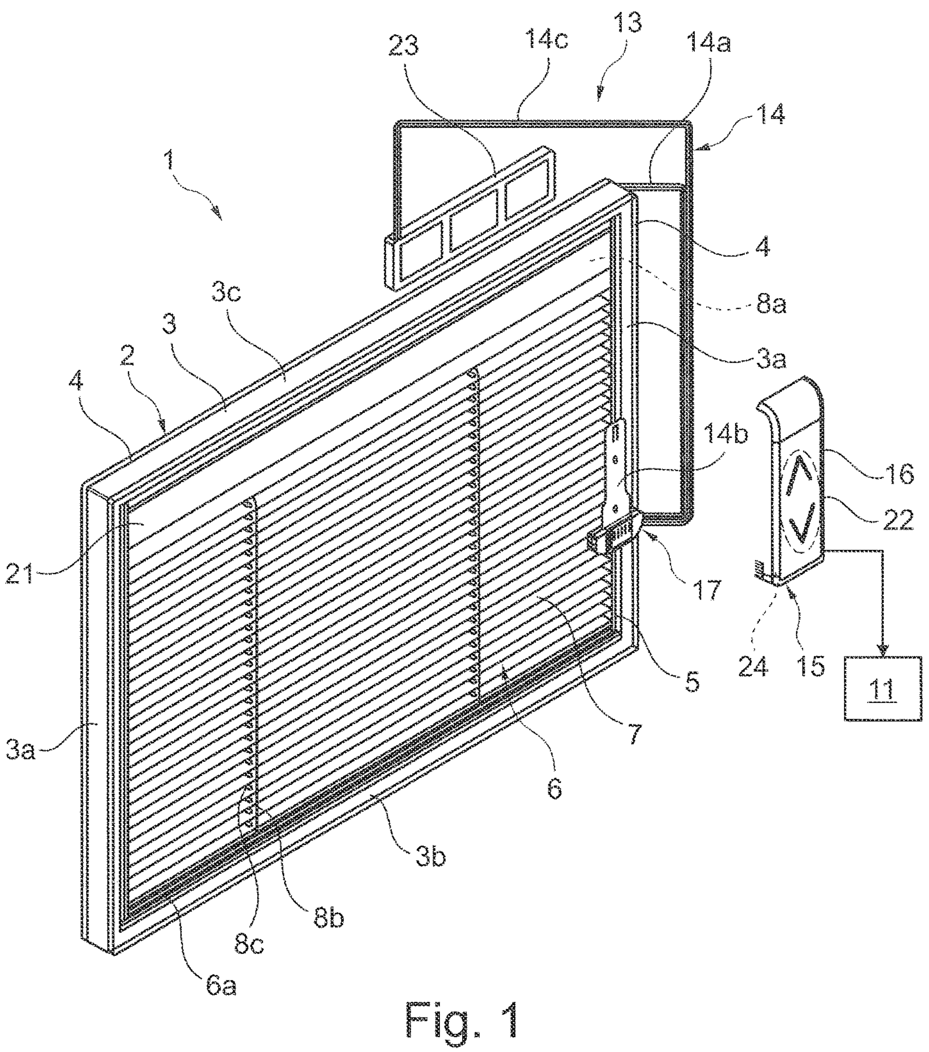
FIG. 1 is a perspective view of an insulated glazing unit of the present invention.
Figure 2:
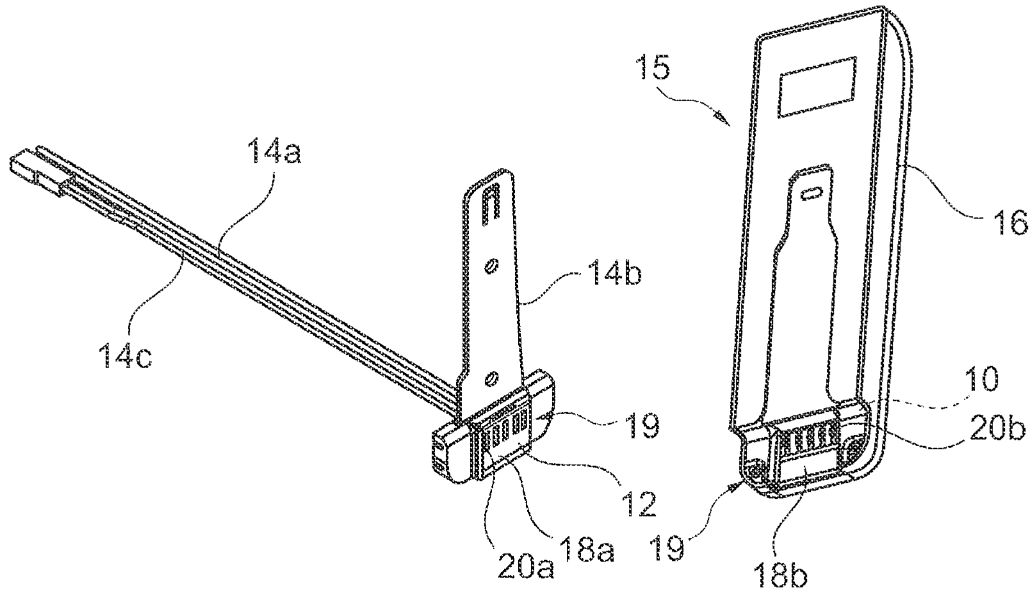
FIG. 2 is a perspective view of a detail of the insulated glazing unit of FIG. 1.
Figure 3:
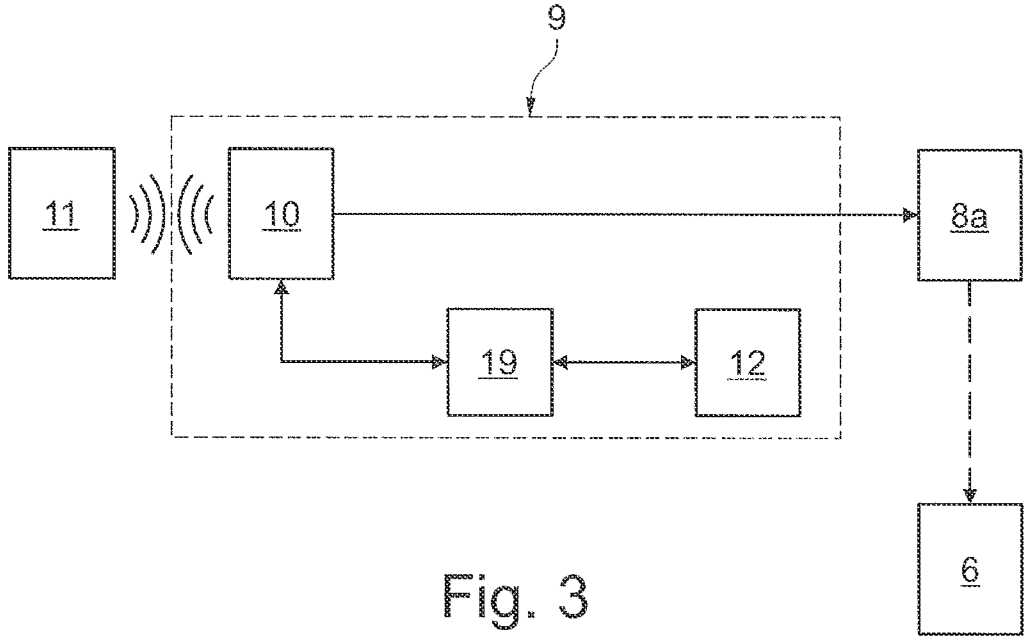
FIG. 3 is a block diagram illustrating the operation of a portion of the insulated glazing unit of FIG. 1.

Particularly referring to FIG. 1, the insulated glazing unit 1 comprises screening means 6 located inside the gap 5.

The screening means 6 can be deployed at least between a retracted configuration and a deployed configuration. In the retracted configuration, the screening means 6 are placed proximate to the upper portion of the frame 2, i.e. proximate to the cross member 3C whereat a box 21 is usually provided. In this configuration, the screening means 6 allow the passage of light through the gap 5.

In the deployed configuration, the screening means 6 are fully extended and their bottom 6A is placed proximate to the lower portion of the frame 2, i.e. proximate to the cross member 3*b*. In this configuration, the screening means 6 block at least partially or entirely the passage of light through the gap 5, as required by the user.

It should be noted that the terms upper portion and lower portion of the frame 2 are referred to the state in which the insulated glazing unit 1 is in its position in the seat of the wall, i.e. a state of operation thereof.

In one embodiment, the screening means 6 consist a blind 7, which may be for example a Venetian blind, a roller blind or a pleated blind. In alternative embodiments of the invention, not shown, the screening means 6 may be of any type known to the skilled person.

Actuator means 8 are associated with the screening means 6, to alternate them at least between the retracted configuration and the deployed configuration. The particular type of actuator means 8 will be variable according to the type of screening means 6 in use.

For example, the actuator means 8 may be placed in the box 21 and may comprise a roller operatively driven by an electric motor 8*a* as well as cords 8*b* and ladders 8*c* suitably connected to the screening means 6 and to the roller.

It should be noted that the electric motor 8*a* may be of any type known to the skilled person and in particular may be one of those described in other patents and/or patent applications by the Applicant hereof. Therefore, the actuator means 8 will not be further described.

The insulated glazing unit 1 further comprises power supply means 13, which are operably connected to the electric motor 8*a* of the actuator means 8.

For this purpose, the power supply means 13 comprise a stationary portion 14 and a moving portion 15.

In one aspect, the stationary portion 14 comprises one or more electric cables 14*a* and a support 14*b*, the electric cables 14*a* being adapted to electrically connect the support 14*b* to the electric motor 8*a*.

On the other hand, the moving portion 15 of the power supply means 13, consists of a battery or a battery module 16, which is adapted to be electrically connected/disconnected to/from the stationary portion 14.

In particular, the battery module 16 is adapted to be electrically connected/disconnected to/from the support 14*b*.

For this purpose, the support 14*b* is specially shaped to house and/or support the battery 16.

More particularly, the support 14*b* is associated with the insulated glazing unit 1 and, preferably, is attached to the door or window frame or to the panes 4 (as shown in FIG. 1).

The support 14*b* is attached to the frame 2 by mechanical means (e.g. screws) and/or by bonding means (e.g. a double-sided adhesive), but if the support 14*b* is attached to the panes 4 a bonding attachment is provided (e.g. by a double-sided adhesive).

In one aspect, the electric cable 14*a* is preferably arranged inside the frame 2 or in any case is designed to be inaccessible to the user.

More in detail, the support 14*b* comprises a first electric connector 18*a*. The battery module 16 comprises a second electrical connector 18*b*, which can be coupled to the first electrical connector 18*a* on the support 14*b*, in particular when the battery module 16 is connected to the support 14*b*. Further details about the electrical connectors 18*a*, 18*b* will be provided hereinbelow.

The insulated glazing unit 1 comprises a control unit 9 which has the function of controlling the alternation of the screening means 6 at least between the retracted configuration and the deployed configuration.

For comprehensive and understandable description, the control unit 9 will be divided into several functional modules. This division does not necessarily reflect the hardware implementation of the control unit 9, which may be of any type.

It should be noted that, as more clearly explained hereinafter, the modules of the control unit 9 are not necessarily located in the same component.

The control unit 9 is in signal communication with the electric motor 8*a* of the actuator means 8, such that it may switch it on and off thereby controlling the movement of the screening means 6.

The insulated glazing unit 1 comprises an active electronic circuit 12 which is in signal communication with the control unit 9 and is configured to store at least the identification data of the control unit 9.

In order to provide interfacing with the active electronic circuit 12, the control unit 9 comprises a read/write module 19.

In particular, according to a particular aspect of the present description, the active electronic circuit 12 is associated with the stationary portion 14 of the power supply means 13.

The term associated means placed in contact (directly or with the interposition of an additional element) with the stationary portion 14 of the power supply means 13.

In other words, the electronic circuit 12 is not associated with the moving portion 15 of the power supply means 13.

Since the active electronic circuit 12 is associated with the stationary portion 14 of the power supply means 13, the identification data of the control unit 9 is advantageously stored in a portion of the insulated glazing unit 1 which shares the fate of the insulated glazing unit itself and not that of the battery 16.

Preferably, the active electronic circuit 12 is a non-volatile memory, namely of EEPROM type.

It should be noted that the active electronic circuit 12, i.e. the memory, is readable/writable when it is powered, and maintains the stored data even when the insulated glazing unit 1 is not powered, for example during replacement of the battery 16.

In the preferred embodiment, the active electronic circuit 12 is integrated in the support 14*b* of the power supply means 13. This arrangement is particularly advantageous because it minimizes the distance required to power the active electronic circuit 12, to enable reading and writing of the stored data.

Preferably the read/write module 19 is integrated in the support 14*b* of the power supply means 13.

For this purpose, the read/write module 19 comprises respective first and second data connectors 20*a*, 20*b*. In particular, the first data connector 20*a* is electrically connected with the active electronic circuit 12 i.e., the memory, whereas the second data connector 20*b* is connected to the moving portion 15 of the power supply means 13 (i.e., to the battery module 16). These first and second data connectors 20*a*, 20*b* are embodied by respective pins which electrically contact each other when the battery module 16 is electrically connected to the stationary portion 14 of the power supply means 13.

In an alternative embodiment, not shown, the data connectors 20*a*, 20*b* may be replaced with RFID or NFC communication modules, not shown. These modules, which are well-known to the skilled person, provide wireless proximity communication. Here, the control unit 9 comprises a first RFID or NFC communication module connected to the active electronic circuit 12 and inserted in the support 14*b*. A second RFID or NFC communication module is connected to the read/write module 19 and is inserted in the battery 16. The RFID or NFC modules are in such positions that, when the battery 16 fits on the support 14*b*, they can communicate with each other.

Alternatively, the active electronic circuit 12 might be integrated in the box 21 or in the frame 2.

These arrangements of the active electronic circuit 12 also fulfill the purpose of storing the identification data of the control unit 9 in an electronic circuit that shares the fate of the insulated glazing unit, although they might require an additional electric connection (not shown), or the use of the powerline technology, with the electric cable 14*a* being used to power the active electronic circuit 12 when reading and writing the stored data.

More in detail, the control unit 9 comprises a control interface 22 for controlling the motor 8*a* of the actuator means.

In a preferred embodiment, the control interface 22 comprises a control section 24 and/or a control element 11.

The control section 24 is formed on a surface of the battery 16, in particular the surface that can be accessed by the user even when the battery is housed on the fixed support 14*b*

The control section 24 is of tactile or touch-sensitive type or consists of a switch or similar devices. For example, also with reference to FIG. 1, the tactile section is embodied by two arrows, indicating two opposite directions to illustrate the possible movements of the screening means 6, once one of these arrows has been touched by the user.

The control element 11 is a radio control device, for example grasped or held in the hand of a user, which is well known and will not be described herein.

A control interface 22 having both the control section 24 (e.g., tactile) and the control element 11 (e.g., radio) affords easier and more convenient management of the movement of the screening means 6 by the user, who can directly control them proximate to the indulated glazing unit 1 by acting on the control section 24 (with the battery module 16 housed on the fixed support 14*b*) and/or far from the insulated glazing unit 1 through the control element 11.

In order to be coupled with the control element 11, the insulated glazing unit 1 comprises receive/transmit module 10 which is configured to receive data via wireless signal communication, in particular, via a radio-frequency, infra-red, Bluetooth, Zigbee connection, or in any other manner known to the skilled person.

The active electronic circuit 12, as mentioned above, is able to store at least data concerning the control unit 9 and in particular data concerning the control element 11, such as the radio communication channel used by the radio control for interfacing.

More in detail, the active electronic circuit 12 is designed to store any kind of data useful for operation of the insulated glazing unit 1. Such data may be preferably but without limitation related to one or more of the following parameters:

azimuth of the screening means 6;

geographic location of the insulated glazing unit 1;

location of the insulated glazing unit 1 inside a building;

type of screening means 6;

size and/or the type of electric motor 8*a;* speed of movement of the screening means 6;

time or mechanical coefficients to be used to ensure synchronous movement with other screening means 6;

positioning of the screening means 6 with respect to the box 21 and/or the cross member 3*b;* admitted operation mode of the screening means 6.

In one aspect, the receive/transmit module 10 is preferably integrated in the battery module 16, or in the moving portion 15 or the stationary portion 14 of the power supply means 13.

The active electronic circuit 12 is in signal communication at least with the receive/transmit module 10 and has the purpose of storing at least identification data of a control element 11.

In one aspect, the power supply means 13 comprise one or more photovoltaic panels 23. For this purpose, the stationary portion 14 comprises an electric connection 14*c* for electrical communication between the support 14*b* and the photovoltaic panel/s 23.

A skilled person may obviously envisage a number of equivalent changes to the above discussed variants, without departure from the scope as defined by the appended claims.

The invention claimed is:

1. An insulated glazing unit, comprising:

a frame;

at least two partially or totally transparent panes associated with the frame to define a gap;

a box arranged proximate to an upper portion of the frame and in side the gap;

screening means inserted in the gap and adapted to alternate at least between a retracted configuration, in which the screening means permits light passage through the gap, and a deployed configuration, in which the screening means at least partially blocks the light passage in the gap;

actuator means arranged in the box and comprising an electric motor operably associated with the screening means to alternate the screening means between the retracted configuration and the deployed configuration;

power supply means operably connected with the actuator means and comprising:

a stationary portion which comprises a support external to the gap and an electrical cable, the electrical cable electrically connecting the support to the electric motor; and a moving portion adapted to be electrically connected/disconnected to/from the stationary portion; and a control unit in signal communication with the electric motor, wherein the control unit is configured to switch on/off the electric motor;

wherein the insulated glazing unit further comprises an active electronic circuit in signal communication with the control unit and configured to at least store identification data of the control unit, and wherein the active electronic circuit is integrated in the support of the stationary portion of the power supply means.

2. The insulated glazing unit of claim 1, wherein the support is associated with one or more of the at least two panes and/or a frame of a door or window.

3. The insulated glazing unit of claim 1, wherein the support comprises a first electrical connector, wherein the naming portion comprises a battery having a second electrical connector adapted to be coupled to the first electrical connector, and wherein the first electrical connector and the second electrical connector, when electrically coupled, allow at least the identification, data stored in the active electronic circuit to be read/written.

4. The insulated glazing unit of claim 1, wherein the active electronic circuit comprises non-volatile memory.

5. The insulated glazing unit of claim 1, wherein the control unit comprises a control interface configured to control the electric motor, and wherein the control interface comprises a control section and/or a control element.

6. The insulated glazing unit of claim 5, wherein the control element comprises a remote controller, and wherein the active electronic circuit is configured to store data concerning the control element.

7. The insulated glazing unit of claim 1, wherein the power supply means comprises one or more photovoltaic panels.

8. The insulated glazing unit of claim 1, wherein the active electronic circuit is configured to store data concerning an azimuth of the screening means and/or a geographic location and/or a location in a building of the insulated glazing unit and/or a type of the screening means and/or a size of the at least two panes and/or the screening means, and/or a type of actuator means and/or a speed of movement of the screening means and/or a time or mechanical coefficients to be used to ensure that movement is synchronous with other screening means of other insulated glazing units.

9. The insulated glazing unit of claim 1, comprising a read/write module which is associated with the stationary portion of the power supply means.

10. The insulated glazing unit of claim 9, wherein the read/write module is integrated in the support.

11. An insulated glazing unit, comprising:

a frame;

at least two panes associated with the frame to define a gap, a box proximate to an upper portion of the frame and inside the gap;

screening means in the gap that is configured to alternate between at least a retracted configuration, in which the screening means permits light passage through the gap, and a deployed configuration, in which the screening means at least partiality blocks the light passage through the gap;

an actuator in the box, wherein the actuator comprises an electric motor operably associated with the screening means to move the screening means between the retracted and deployed configurations, a power supply operably connected with the actuator and comprising:

a stationary portion, comprising a support external to the gap and an electrical cable configured to electrically connect the support to the electric motor; and a moving portion, configured to electrically connect to/disconnect from the stationary portion;

a control unit in signal communication with the electric motor, wherein the control unit is configured to switch on/off the electric motor, and an active electronic circuit in signal communication with the control unit and configured to at least store identification data of the control unit;

wherein the active electronic circuit is integrated in the support of the stationary portion of the power supply.

12. The insulated glazing unit of claim 11, wherein both of the at least two panes are partially transparent.

13. The insulated glazing unit of claim 11, wherein both of the at least two panes are totally transparent.

14. The insulated glazing unit of claim 11, wherein the support comprises a first electrical connector, wherein the moving portion of the power supply comprises a battery having a second electrical connector configured to couple to the first electrical connector, and wherein electrically coupling the first and second electrical connectors allows at least the identification data stored in the active electronic circuit to be read/written.

15. The insulated glazing unit of claim 11, wherein the active electronic circuit comprises non-volatile memory.

16. The insulated glazing unit of claim 11, wherein the active electronic circuit comprises an Electrically Erasable Programmable Read-Only Memory (EEPROM).

17. The insulated glazing unit of claim 11, wherein the control unit comprises a control interface configured to control the electric motor.

18. The insulated, glazing unit of claim 11, wherein the power supply comprises one or more photovoltaic panels.

19. The insulated glazing unit of claim 11, further comprising: a read/write module associated with the stationary portion of the power supply.

20. The insulated glazing unit of claim 19, wherein the read/write module is integrated in the support.

* * * * *